United States Patent
Grandverger et al.

(10) Patent No.: US 6,731,328 B1
(45) Date of Patent: May 4, 2004

(54) METHOD AND APPARATUS FOR DIGITIZING IMAGES FROM PHOTOGRAPHIC FILM

(75) Inventors: Marijan Grandverger, Munich (DE); Ekkehard Gross, Forstinning (DE); Bernhard Lorenz, Marzling (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 465 days.

(21) Appl. No.: 09/672,685

(22) Filed: Sep. 28, 2000

(30) Foreign Application Priority Data

Sep. 28, 1999 (DE) .......................... 199 46 332

(51) Int. Cl.$^7$ .......................... H04N 3/36; H04N 5/253; H04N 9/11
(52) U.S. Cl. .......................... 348/97; 348/96
(58) Field of Search ...................... 348/96–112; 359/17, 359/26, 30

(56) References Cited

U.S. PATENT DOCUMENTS

| | | | | |
|---|---|---|---|---|
| 5,075,539 A | * | 12/1991 | Shiraishi .................. | 250/208.1 |
| 5,218,439 A | * | 6/1993 | Mizoguchi et al. ........... | 348/96 |
| 5,335,093 A | * | 8/1994 | Imoto ......................... | 358/487 |
| 5,448,372 A | * | 9/1995 | Axman et al. .............. | 386/124 |
| 5,973,700 A | * | 10/1999 | Taylor et al. ................. | 345/427 |
| 5,999,302 A | * | 12/1999 | Sweeney et al. ............ | 359/216 |

* cited by examiner

*Primary Examiner*—Vu Le
(74) *Attorney, Agent, or Firm*—Milde & Hoffberg, LLP

(57) ABSTRACT

Apparatus for digitizing images (1) includes a reader device (3), such as a CCD array, having a photo-sensitive surface (4) that comprises a large number of pixels arrayed longitudinally and laterally. The reader device (3) is subjected to a ninety degree rotation and/or linear displacement by a distance of several pixels, as necessary, before and/or during the digitization process so as to provide optimum digital resolution for a variety of image formats.

17 Claims, 5 Drawing Sheets

METHOD AND APPARATUS FOR DIGITIZING IMAGES FROM PHOTOGRAPHIC FILM

BACKGROUND OF THE INVENTION

The present invention concerns a method as well apparatus for scanning and digitizing photographic images from photographic film.

In order to process individual images on photographic film, and then to print them on paper using, for example, a laser printer, the images must be scanned at high resolution and then digitized. One difficulty encountered during this process is the loss of information or resolution. This is normally caused by the fact that, for technical reasons, the smallest piece of information recordable on film is smaller than the resolution of the reading device. In other words, the number of data bits per square unit on the film is greater than that of the reading device. The grain size of a film is smaller than the pixel size of a digital reader device such as a suitable CCD array (for example, a CCD chip with 2042×3072 pixels).

Another problem encountered with a scanning and digitizing system is that the format size can vary from film to film, so that the format of an individual image may not always agree with that of the CCD array. For example, images on a roll of film may have formats of either 60 mm×45 mm or 60 mm×90 mm. In such cases, not all pixels of the CCD array may be used to receive the image. This leads to a further reduction in scanning resolution.

SUMMARY OF THE INVENTION

The principal objective of the present invention is to improve upon a method and reading device of the type described above so as to realize improved resolution from a variety of film types and formats using such a reading device.

This objective, as well as other objectives which will become apparent from the discussion that follows, are achieved, according to the present invention, by providing a reader device having a photo-sensitive surface comprising a large number of pixels arrayed longitudinally and laterally, and by displacing the reader device rotationally and/or linearly by a distance of several pixels before and/or during the digitization process.

The present invention is thus able to take into account the various sizes (dimensions, landscape or portrait format, etc.) of differing film types, as well as the results of the asymmetry of a rectangular CCD chip, and take advantage of this. A particular advantage of the invention is the increase in image quality of large-format prints. For such prints, the disadvantages of existing technology set forth above with respect to resolution loss during digitization of negatives are particularly severe.

A further advantage of the invention is to be found in the expanded range of application with respect to film types and formats using the same reader device and obtaining optimum resolution.

Another advantage is that the reader device may be rotated or otherwise displaced in order to allow so-called "eccentric cropping" with optimum resolution for all negative formats.

A further advantage is that the reader device contains a sensitive surface with longitudinal and lateral axes. Movement of such an asymmetrical reader device, and especially its alignment before the reading or scanning process, can be especially advantageous for resolution optimization. The reader device preferably includes a CCD, particularly with a rectangular photo-sensitive area.

Using a preferred version of the invention, the reader device is aligned with the exposed areas before the reading process in order to adjust the optimum resolution.

In order to optimize the resolution, it is preferable to set the alignment of the reader device depending on the dimensions of the exposed area of a film.

It is preferable that the exposed areas have a longitudinal and a lateral dimension, and that the reader device be so aligned before reading that the longitudinal dimension of the photo-sensitive area is basically parallel to the longitudinal dimension of the exposed areas. In this manner, the existing asymmetries are used to optimize the resolution and to minimize information loss during scanning.

It is advantageous to align the reader device by rotating it, especially by rotating it in its plane by ninety degrees. This allows a CCD to so positioned that its orientation may be set to the orientation providing the best resolution.

It is also preferable that the reader device perform a number of reading passes over a specified, exposed area of a film (or of an image), and that the sampled values be compiled into an overall digital image. Individual image areas may be read in an overlapping or adjacent manner. An overlap, for example, may be especially helpful in order to compensate for regional differences in brightness of scanner illumination.

In order to compile different image areas using several reading passes, the reading device is displaced between subsequent reading passes, preferably linearly.

If an image is to be read twice, the reading device is displaced by about half of its width or length (or the width or length of the sensitive area) between reading passes. This displacement is performed within a plane.

It is advantageous that the reading device be displaced by about half of its width and length (or the width and length of the sensitive area), thus performing four individual reading procedures per image.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
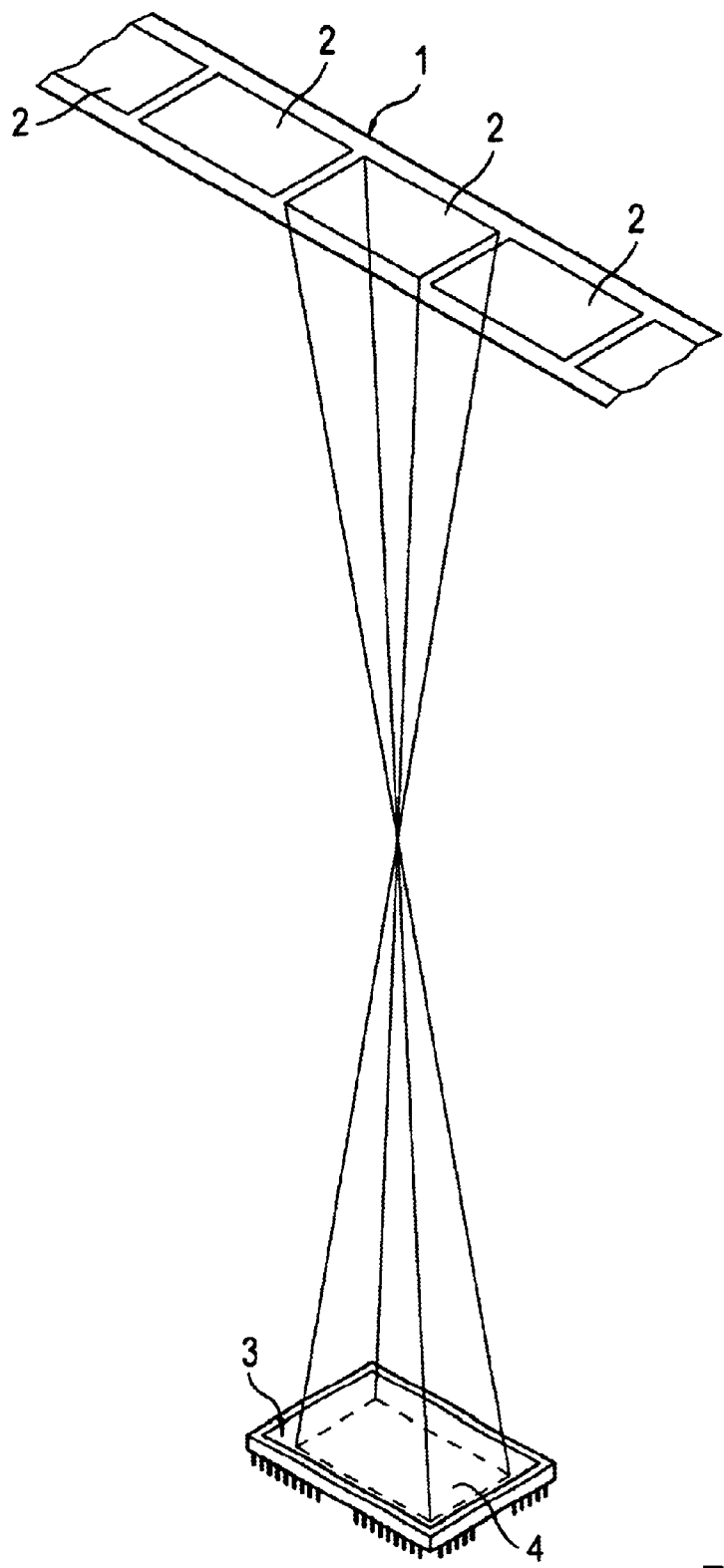
FIG. 1 is a schematic diagram of the digital reading of a small-format film using a CCD.

The preferred embodiments of the present invention will now be described with reference to FIGS. 1–5 of the drawings. Identical elements in the various figures are designated with the same reference numerals.

FIG. 1 shows the digital reading of a small-format film 1 that contains individual images as exposed areas 2. The exposed areas 2 possess a basically rectangular format. Further, the areas 2 are arranged adjacent in transverse-format along the direction of movement of the small-format film 1. A CCD 3 is provided to read the exposed areas 2. The CCD 3 contains a basically rectangular active or sensitive area 4. In the CCD's basic position, the photo-sensitive area 4 is so aligned that the longer edge of this area is parallel to the longer edge of the illustrated regions, shown in dashed lines. Each exposed negative is read by the CCD 3.

Figure 2:
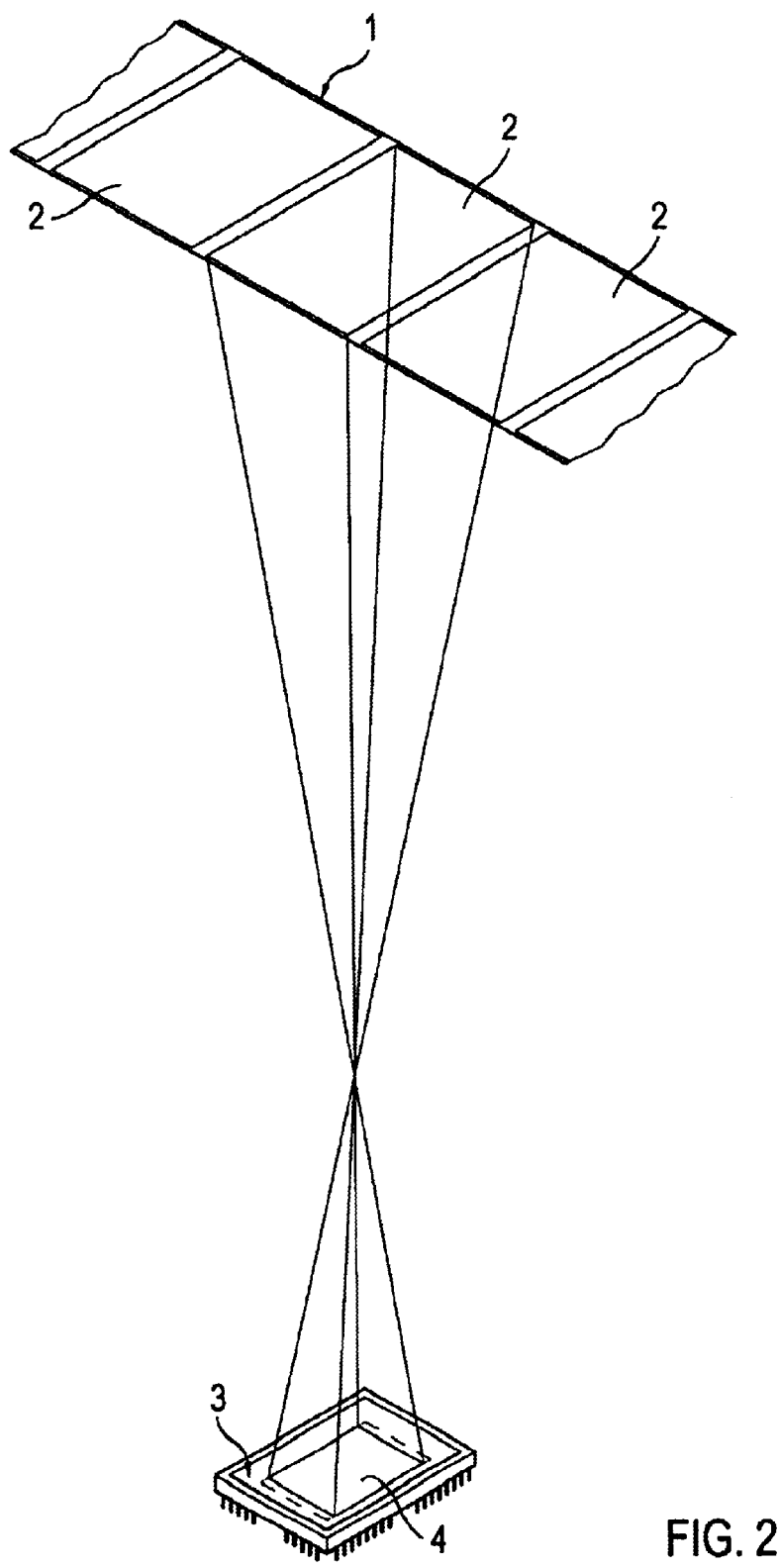
FIG. 2 is a schematic diagram of the digital reading of a large-format roll film using a CCD.

FIG. 2 shows the digital reading of a film roll 60 mm in width, designated as 1. Exposed areas 2 are arranged adjacent in portrait alignment on the film roll 1 with dimensions of 60 mm×45 mm (half-format), for example. The reading device or CCD 3 provided to read the exposed areas 2 is rotated by ninety degrees from its basic position (as shown in FIG. 1) using a rotating device (not shown), so that the alignment of the rectangular, optically-sensitive area 4 of the CCD 3 basically agrees with the alignment or orientation of the exposed areas 2.

Figure 3:
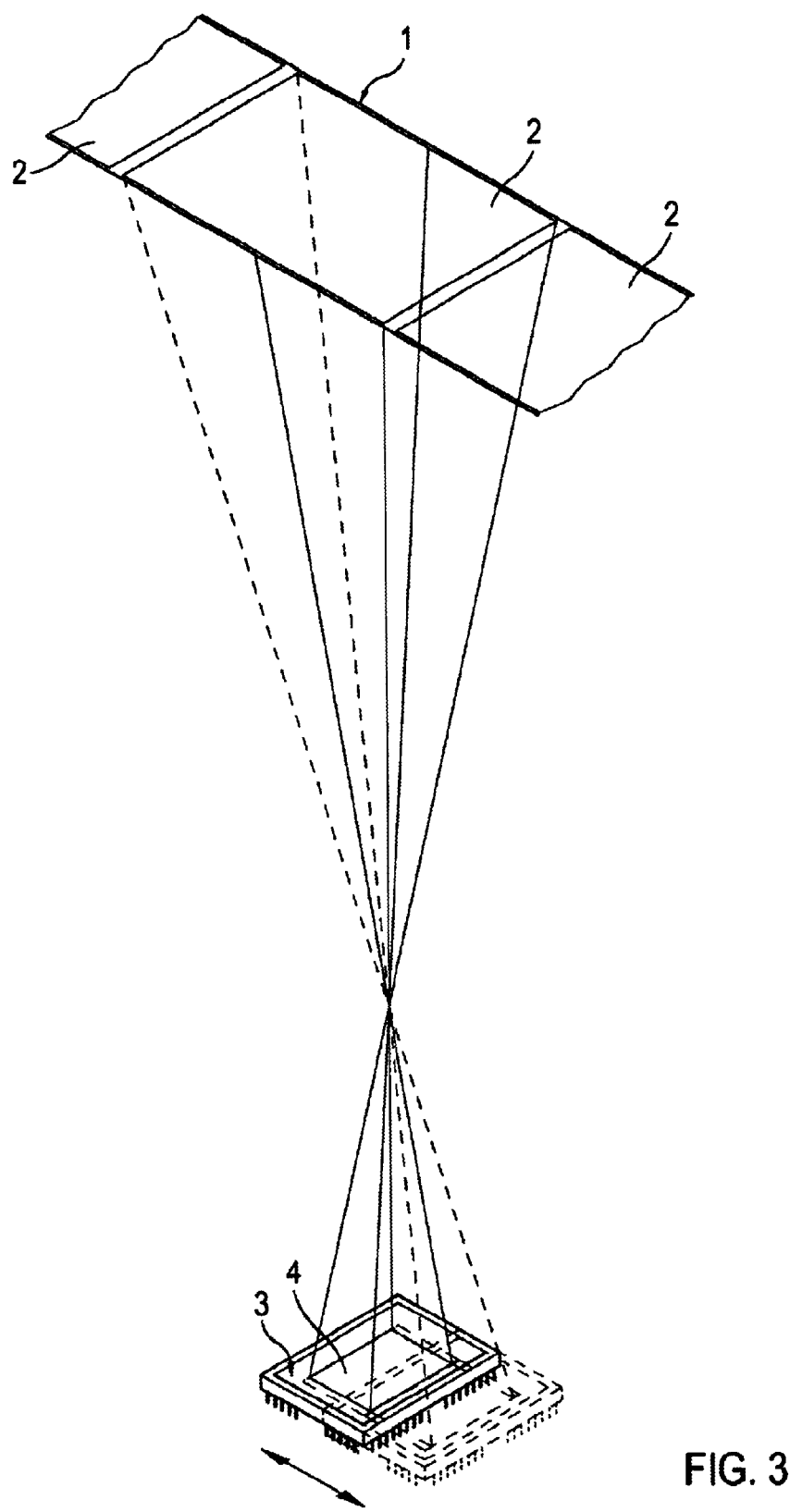
FIG. 3 is a schematic diagram of the digital reading of a transverse-format roll film using a CCD, whereby the CCD is displaced linearly between reading passes.

FIG. 3 shows the digital reading of a roll film 1 with areas 2 that were exposed in transverse-format. A CCD 3 has been rotated by ninety degrees from the basic position shown in FIG. 1 before the actual reading pass (as also shown in FIG. 2). The exposed areas 2 have dimensions of 60 mm×90 mm. Of course, the film roll 1 may also contain exposed areas in other transverse-formats such as 60 mm×70 mm or 60 mm×80 mm, or even in square formats such as 60 mm×60 mm.

In order to read an image 2, the CCD 3 is displaced linearly to the left or right by about half its width through its cross dimension after the first reading pass (see arrowed direction in FIG. 3) as shown in the illustration. Thus, the scanned partial images may be overlapped or precisely adjacent. An image processor (not shown) subsequently compiles the partial images into one overall image.

Figure 4:
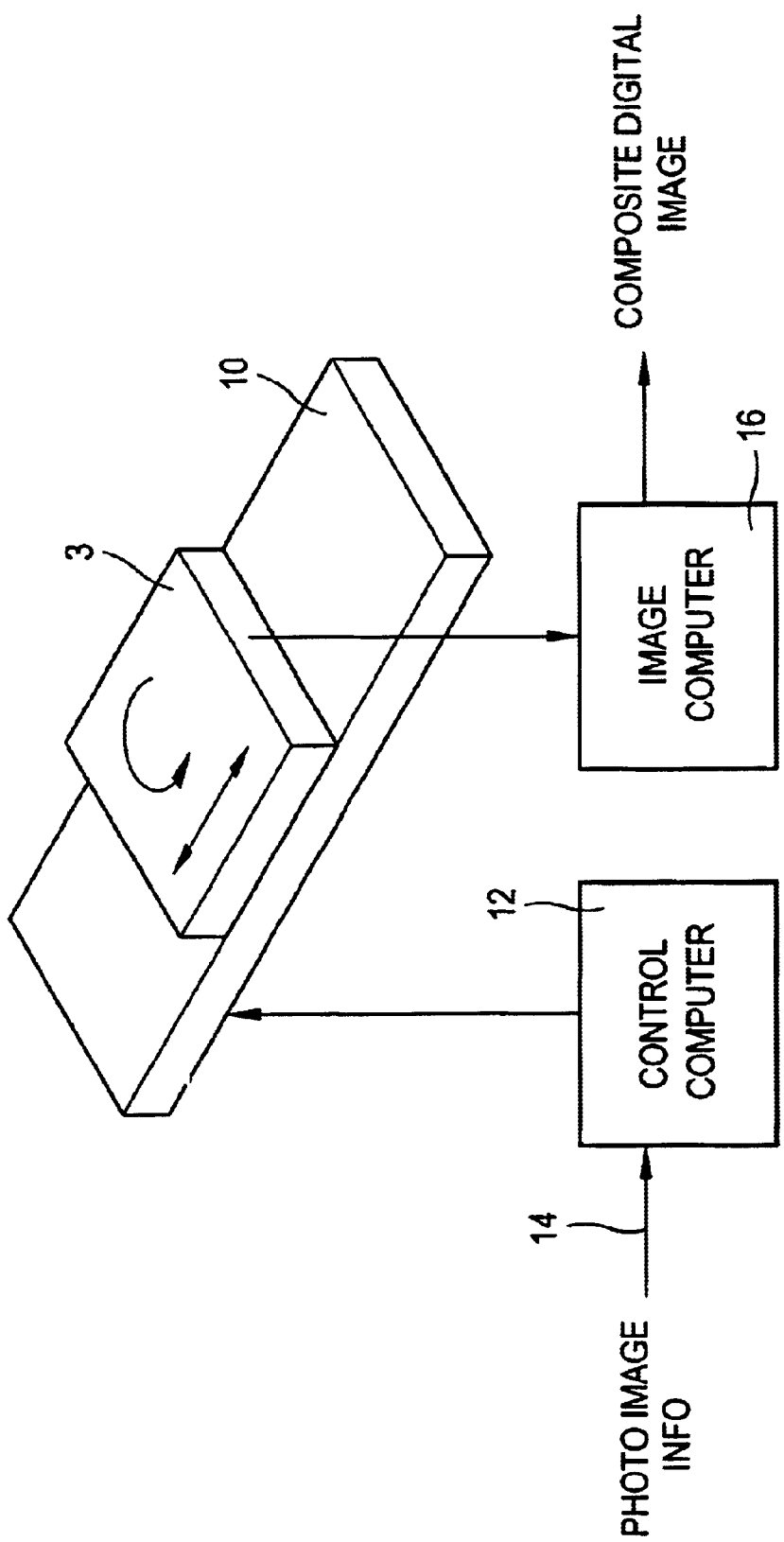
FIG. 4 is a block diagram of a device for rotating and displacing a reading device in accordance with the present invention.

FIG. 4 illustrates how the concept according to the present invention may be implemented by a device for rotating and displacing the reading device (CCD 3) illustrated in FIGS. 1–3. As may be seen, a mechanical device 10 is operative to rotate and/or linearly displace the CCD 3. This device 10 is responsive to control signals received from a control computer 12. The control computer receives an input 14 which includes information about the size and orientation of the photographic image. The output of the CCD 3 is passed to an image computer 16 which processes the composite digital image.

Figure 5:
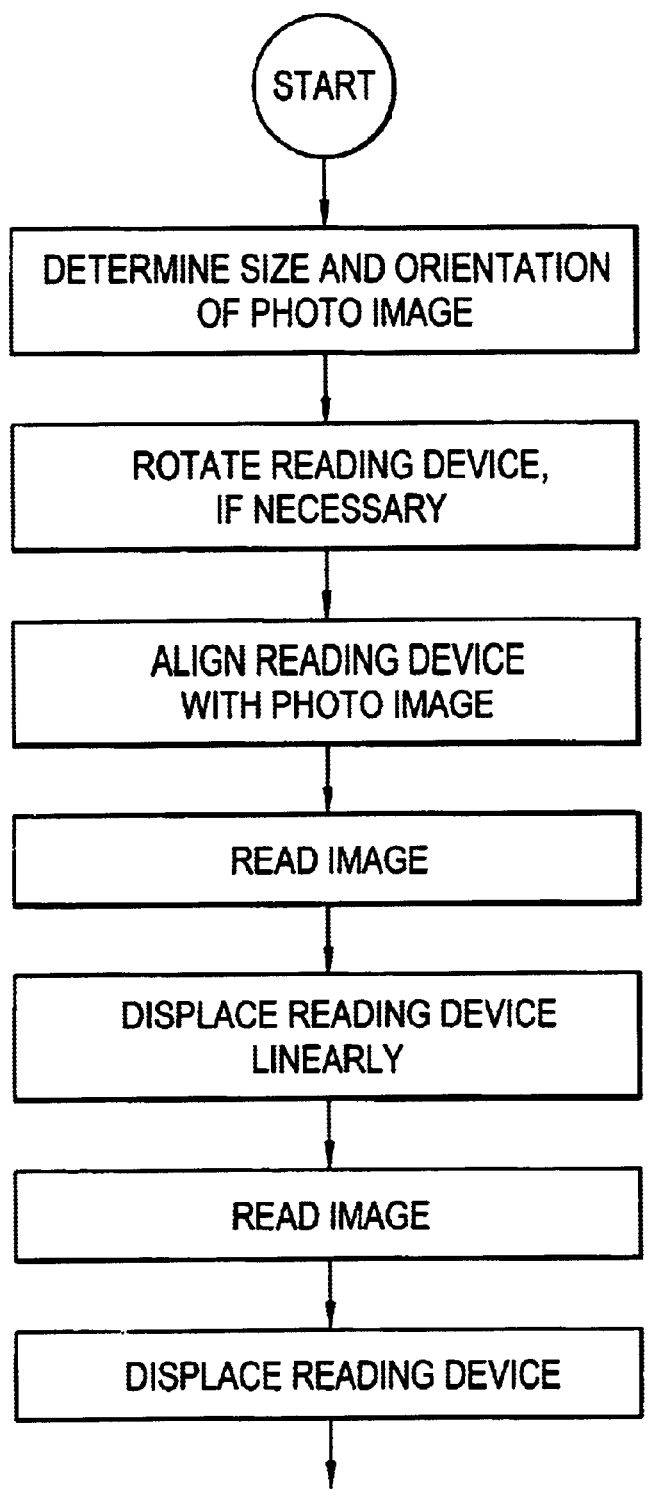
FIG. 5 is a flow chart of the control program for the control computer of FIG. 4.

As shown in FIG. 5, the control program starts by receiving the input 14 which specifies the size and orientation of the photographic image. In response thereto, the control program causes the device 10 to rotate the reading device 3, if necessary, and then align the reading device so that one edge of the optically sensitive area 4 is aligned with an edge of the photographic image. Thereafter, the photographic image is read into the CCD and passed to the image computer for processing. If the dimensions of the photographic image, projected onto the photosensitive area 4, are greater than the size of the photosensitive area, the reading device 3 is displaced linearly, as many times as necessary, and the photographic image is read after each displacement.

An overall review of FIGS. 1 through 3 shows clearly the principle of the invention whereby a single CCD that is rotated or displaced may be used to read a variety of different films with optimal resolution. The invention was described above in detail based on preferred embodiments. It will be apparent to a person skilled in the art that many changes and modifications may be made to the embodiments without departing from the basic concept of the invention. In particular, any type of direct or indirect relative motion between the reading device and the film to be read may be implemented by the invention.

What is claimed is:

1. A method for digitizing original images using a reading device that contains a photo-sensitive, rectangular surface with different longitudinal and lateral dimensions and comprising a large number of pixels arranged longitudinally and laterally, said method comprising the steps of rotating the reading device about an axis perpendicular to the photo-sensitive surface depending upon the orientation of the photo-sensitive surface in relation to that of the original image and thereafter reading said original image with said reading device, thereby to provide optimum digital resolution for a variety of original image formats.

2. The method according to claim 1, wherein the reading step is performed in several passes of the reading device depending upon the dimensions of said original image, and wherein the reading device is linearly displaced by a plurality of pixels between individual passes.

3. The method according to claim 2, wherein the reading device is linearly displaced by about half of its dimension in the longitudinal or lateral direction.

4. The method according to claim 3, wherein the reading device passes over said original image twice.

5. The method according to claim 2, wherein individual original image areas are read in an overlapping manner by the multiple reading passes.

6. The method according to claim 2, wherein individual original image areas are read in an adjacent manner by the multiple reading passes.

7. The method according to claim 1, wherein the reading device includes a CCD.

8. The method according to claim 1, wherein the reading device is aligned with said original image before reading in order to provide the optimum resolution.

9. The method according to claim 1, wherein the reading device is rotated ninety degrees.

10. The method according to claim 1, wherein the reading device reads said original image a plurality of times and wherein the collected data are compiled into a single overall image.

11. The method according to claim 1, wherein the reading device is moved within a plane.

12. The method according to claim 11, wherein the reading device is linearly displaced by about half of its dimension in the longitudinal or lateral direction.

13. The method according to claim 12, wherein the reading device passes over said original image four times.

14. Apparatus for digitizing an original image with a reading device comprising a rectangular photo-sensitive surface with differing longitudinal and lateral dimensions and having a large number of pixels arranged longitudinally and laterally, the improvement comprising a device that rotates the reading device about an axis perpendicular to the photo-sensitive surface dependent upon the orientation of the photo-sensitive surface in relation to that of the original image, thereby to provide optimum digital resolution for a variety of original image formats.

15. The apparatus according to claim 14, further comprising a device that linearly displaces the reading device by several pixels between individual passes in dependence upon the dimensions of said image.

16. The apparatus according to claim 15, wherein the device is a linear positioning device.

17. The apparatus according to claim 15, wherein the device is a planar positioning device.

* * * * *